United States Patent [19]

Sickler

[11] 4,070,013

[45] Jan. 24, 1978

[54] STUD GRIPPING CLAMP

[76] Inventor: Jack R. Sickler, P.O. Box 20803 Pioneer Station, Billings, Mont. 59104

[21] Appl. No.: 765,619

[22] Filed: Jan. 25, 1977

[51] Int. Cl.² .............................................. B25G 3/36
[52] U.S. Cl. .................................. 269/321 S; 403/81; 403/317; 403/DIG. 7; 24/248 B; 403/399
[58] Field of Search ....................... 403/17, 33, 53, 81, 403/100, 164, 316, 317, 331, 343, 399, DIG. 7; 24/248 E, 248 B; 249/219 W; 269/236, 321 S, 321 F

[56] References Cited

U.S. PATENT DOCUMENTS

| 512,543 | 1/1894 | Froberg | 24/248 B |
|---|---|---|---|
| 966,387 | 8/1910 | Diflo | 24/248 B |
| 1,031,928 | 7/1912 | Heidbrink et al. | 403/399 |
| 1,036,168 | 8/1912 | Updike | 24/248 B |
| 1,085,353 | 1/1914 | Miller | 403/399 |
| 1,419,193 | 6/1922 | Allen | 403/399 |
| 1,562,391 | 11/1925 | Vidon | 403/399 |
| 3,083,007 | 3/1963 | Campfield | 269/321 S |

FOREIGN PATENT DOCUMENTS 26,765 of 1904 United Kingdom ................. 403/100

Primary Examiner—Wayne L. Shedd
Attorney, Agent, or Firm—Clarence A. O'Brien; Harvey B. Jacobson

[57] ABSTRACT

An elongated channel-shaped body is provided including a pair of opposite side longitudinal flanges and an elongated bight portion extending between and interconnecting one pair of corresponding longitudinal edge portions of the flanges. One of the flanges is rigid with and thus fixed relative to the bight portion and the other flange is pivotaly supported therefrom for oscillation about an axis extending longitudinally of the body along the adjacent marginal edges of the pivoted flange and the bight portion. The pivoted flange is oscillatable between a closed position with the adjacent sides of the flanges substantially parallel and an open position with the free longitudinal edge of the pivoted flange swung away from the free edge of the rigid flange. An elongated lever has one end pivotaly supported from one end of the bight portion on the side thereof remote from the flanges and an intermediate portion of the lever includes portions engageable with remote side surfaces of the longitudinal midportions of the flanges to cam the pivoted flange toward its closed position and to brace the rigid flange against flexure away from the pivoted flange. One end of the bight portion includes a structure defining a transversely extending and endwise outwardly opening channel for cradling a piece of lumber in the channel and the other end of the bight portion includes a transverse outwardly projecting abutment flange which may be utilized to support a wall board relative to a stud with which the clamp is clampingly engaged.

16 Claims, 7 Drawing Figures

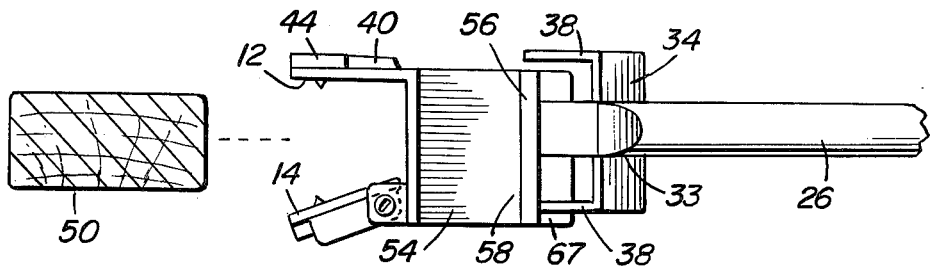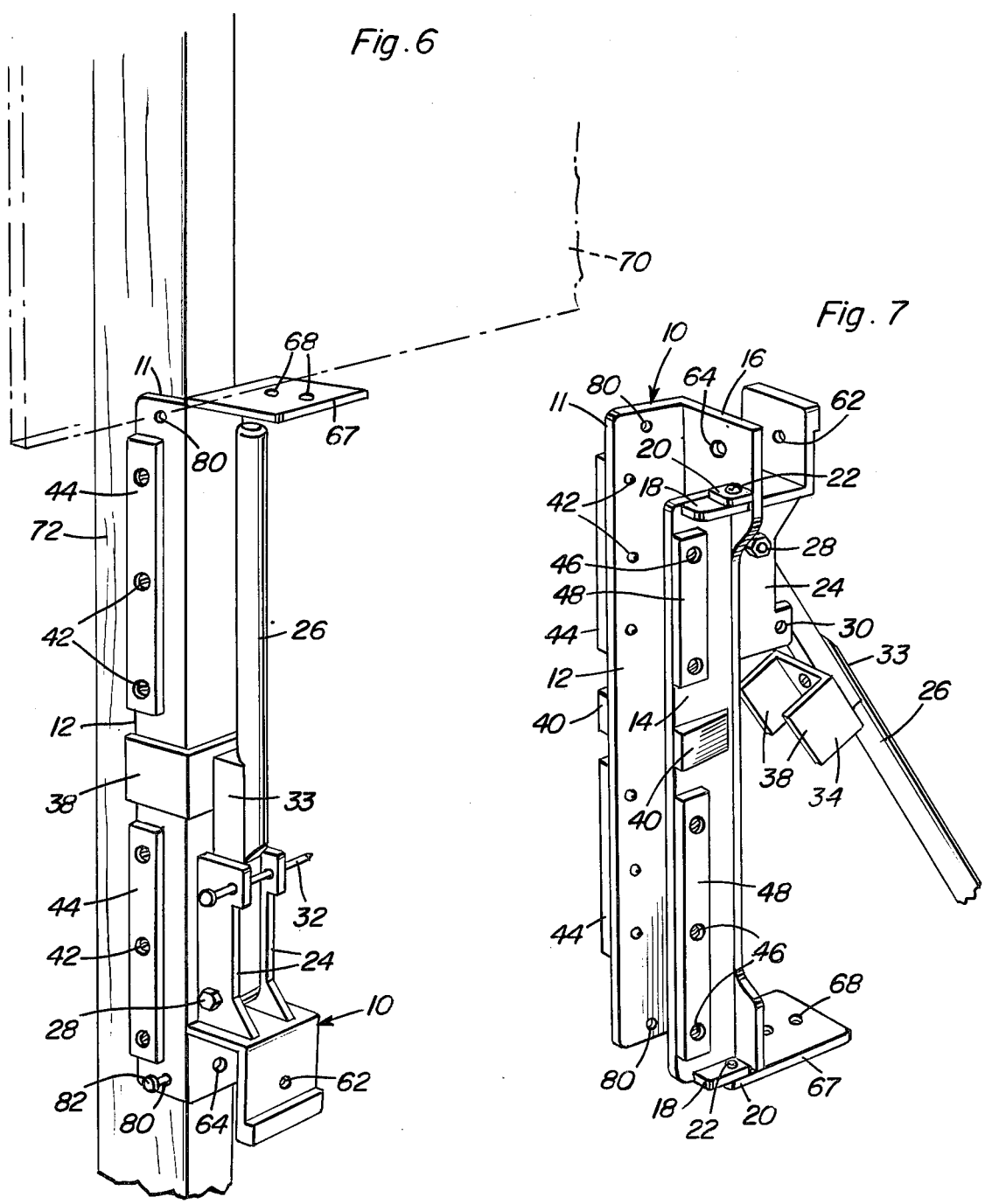

STUD GRIPPING CLAMP

BACKGROUND OF THE INVENTION

Various forms of lumber clamps and braces have been heretofore designed for the purpose of assisting in the erection of beams, wall panels and ceiling panels. However, most of these clamping and/or bracing structures require separate attaching elements for supporting the clamps or braces from supportive studs or the like and other previously known clamps and/or braces are constructed in a manner whereby the clamping action afforded on a supportive stud or the like is minimal.

Examples of previously known forms of lumber clamps and braces are disclosed in U.S. Pat. Nos. 1,031,928, 1,419,193, 1,562,391, 1,895,766, and 2,323,195.

BRIEF DESCRIPTION OF THE INVENTION

The clamp of the instant invention comprises a channel member having one of its side flanges pivotally supported from the remainder of the channel member and a lever is pivotally supported from the channel member and includes cam portions for camming the pivoted flange to a closed position and bracing the other flange of the channel member against flexure away from the pivoted flange when the lever is swung to its active position, the lever being angularly displaceable away from its active position to an inactive position enabling the pivoted flange of the channel member to swing away from the stationary flange thereof toward an open position, whereby the clamp may be readily disengaged from a piece of lumber with which it was previously clampingly engaged.

One end of the channel member is provided with structure defining a transversely extending and endwise outwardly opening channel in which to embracingly and supportively receive a beam or the like to be secured to a stud from which the clamp is supported and the opposite end of the channel member includes a transverse outwardly projecting abutment flange which may be utilized to abuttingly support wall boards or panels to be secured to a stud from from which the clamp is supported.

The main object of this invention is to provide a lumber clamp having multiple uses and which may be utilized to support beams as well as wall panels relative to studs to which the beams and wall panels are to be secured.

Another object of this invention is to provide a lumber clamp which may be readily utilized in the construction of a scaffolding.

Still another important object of this invention is to provide a lumber clamp constructed in a manner so as to afford an anti-slip clamp engagement with a stud or the like from which the clamp is supported.

Another important object of this invention is to provide a clamp in accordance with the immediately preceding objects and including means by which the clamp may be temporarily nailed to a supportive stud in addition to being clamped relative thereto.

Yet another object of this invention is to provide a lumber clamp which may additionally be utilized to support dry wall panels from studs and ceiling panels from supportive studs.

A final object of this invention to be specifically enumerated herein is to provide a lumber clamp in accordance with the preceding objects and which will conform to conventional forms of manufacture, be of simple construction and easy to us, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a horizontal, sectional view of the stud of FIG. 1 with the clamp of the instant invention in position in readiness to be applied to and clampingly engaged with the stud;

FIG. 6 is a fragmentary, perspective view of a stud with the clamp of the instant invention clampingly engaged there with in an inverted position relative to the position thereof illustrated in FIG. 1 and with the clamp being utilized to support a wall panel therefrom in proper position relative to the stud for securement thereto, the wall board or panel being illustrated in phantom lines; and FIG. 7 is a perspective view of the clamp.

DESCRIPTION OF THE PREFERRED EMBODIMENTS

Figure 1:
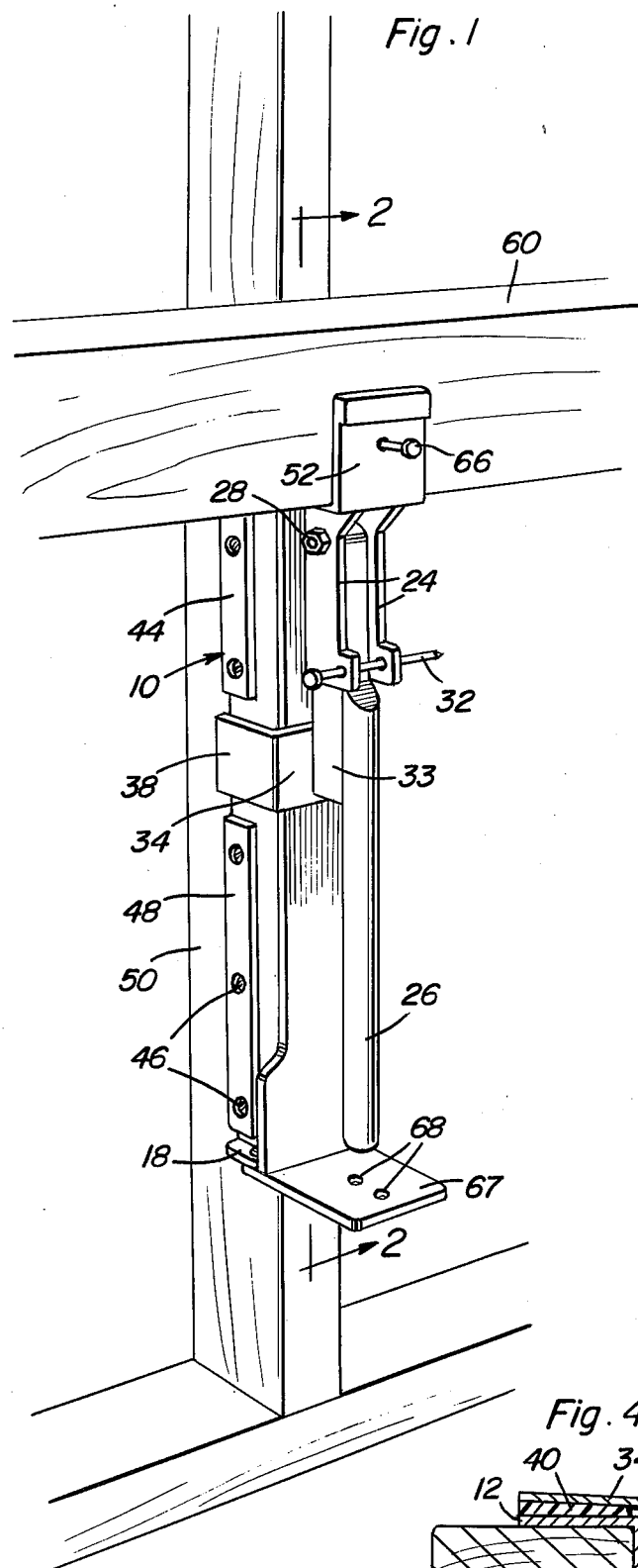
FIG. 1 is a fragmentary, perspective view of a portion of a building framing assembly with a clamp constructed in accordance with the present invention clamped to a stud of the framing assembly and in use supporting a horizontal two-by-four from the stud.

Referring now more specifically to the drawings, the numeral 10 generally designates a clamp constructed in accordance with the present invention. The clamp 10 defines a channel member 11 including a pair of opposite side generally parallel elongated flanges 12 and 14 interconnected at corresponding longitudinal marginal edges by means of a bight portion 16 extending therebetween. The flange 12 and the bight portion 16 are integrally formed and are substantially rigidly interconnected. The flange 14, on the other hand, includes opposite end out turned flanges 18 pivotally supported from opposite end right angle flanges 20 carried by the opposite ends of the bight portion 16 by means of pivot fasteners 22 secured through the flanges 18 and 20.

The outer side of the bight portion 16 remote from the flanges 14 and 18 includes longitudinally extending and outwardly projecting mounting flanges 24 between which one end of an elongated lever 26 is pivotally supported by means of a pivot fastener 28 secured through the lever 26 and the flanges 24. The flanges 24 are carried at a first end of the bight portion 16 and portions of the flanges 24 spaced from the pivot fastener 28 toward the second end of the bight portion 16 include aligned apertures 30 through which a nail 32 or other fastener may be removably passed in order to secure the lever 26 in the active position thereof, illustrated in FIGS. 1, 2, 3, 4, and 6.

A portion 33 of the lever 26 centrally intermediate its opposite ends has a short channel member 34 secured thereto on the side thereof adjacent the bight portion 16 by means of machine screws 36. The channel member 34 opens toward the bight portion 16 and includes opposite side flanges 38 between which the flanges 12 and 14 may be embracingly engaged upon movement of the lever 26 from the inactive position thereof illustrated in FIG. 7 to the active position thereof illustrated in FIGS. 1 and 6.

Figure 2:
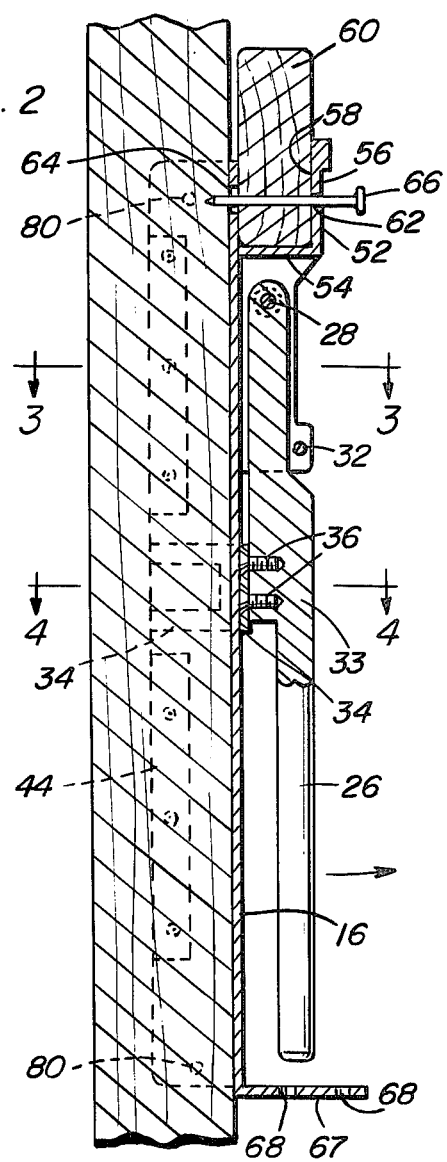
FIG. 2 is a fragmentary, enlarged, vertical, sectional view taken substantially upon the plane indicated by the section line 2—2 of FIG. 1.
Figure 3:
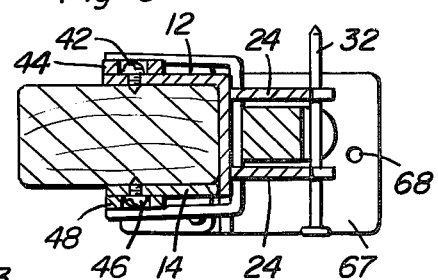
FIG. 3 is a horizontal, sectional view taken substantially upon the plane indicated by the section line 3—3 of FIG. 2.
Figure 4:
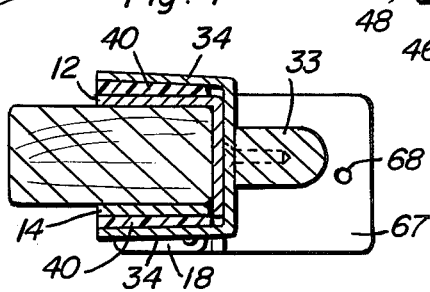
FIG. 4 is a horizontal, sectional view taken substantially upon the plane indicated by the section line 4—4 of FIG. 2.

The longitudinal midportions of the flanges 12 and 14 include outer side cam wedges 40 secured thereto with which the flanges 38 are engageable upon movement of the lever 26 from the inactive position illustrated in FIG. 7 to the active position illustrated in FIGS. 1 and 2 and the flanges 38 comprise camming members which are engageable with the cam wedges 40 in order to cam the flange 14 from the open position thereof illustrated in FIG. 5 to the closed position thereof illustrated in FIGS. 1, 3, and 4 upon movement of the lever 26 to the active position thereof. Of course, the flanges 38 are engaged with both of the cam wedges 40 when the lever 26 is in the active position and one of the flanges 38 serves to swing the flange 14 from the open position of FIG. 5 to the closed position of FIG. 1 and both of the flanges 38 serve to prevent movement of the longitudinal midportions of the flanges 12 and 14 away from each other when the flange 14 is in the closed position and the lever 26 is in its active position.

The flange 12 has a plurality of threaded fasteners 42 secured therethrough at points spaced therealong and apertured protective plates 44 are secured over the side of the flange 12 remote from the flange 14 with the heads of the fasteners 42 received in the apertures formed in the plates 44. In addition, the flange 14 has similar fasteners 46 formed therethrough and apertured plates 48 corresponding to the plates 44 are secured to the side of the flange 14 remote from the flange 12 with the heads of the fasteners 46 recessed in the apertures formed in the plates 48. The inner ends of the fasteners 42 and 46 project inwardly of the inner surfaces of the flanges 12 and 14 and are, therefore, operable to penetrate at least the opposing outer surfaces of a stud such as the stud 50 with which the clamp 10 is engaged in FIG. 1. In addition, the plates 44 and 48 may be struck with a hammer or other similar impact tool (the recessed heads of the fasteners being protected against direct impact) from the outer side of the flanges 12 and 14 in order to insure that the inner ends of the fasteners 42 and 46 will penetrate the opposing outer surface portions of the stud 50 and thus securely anchor the clamp 10 in position on the stud 50 against shifting relative thereto.

The end of the bight portion from which the flanges 24 are supported includes and L-shaped member 52 consisting of first and second flanges 54 and 56 and the flange 54 is secured across the adjacent ends of the flanges 24 with the free marginal edge of the flange 54 being secured to the outer surface of the bight portion 16. In this manner, the L-shaped member 52 and the adjacent end of the bight portion 16 define a transversely extending and endwise outwardly opening channel 58 in which a two-by-four 60 or the like may be cradled, see FIGS. 1 and 2. Further, the flange 56 and bight portion 16 are provided with aligned small and large diameter apertures 62 and 64, respectively, through which a nail 66 may be secured in order to temporarily secure the two-by-four 60 within the channel 58. The aperture 64 is formed larger in diameter than the aperture 62 in order that the nail 66 may pass through aperture 64 in bight portion 16, even if the nail is deflected as it is driven through the two-by-four 60.

The end of the bight portion 16 remote from the channel 58 includes an outwardly projecting transverse abutment plate 67 provided with a pair of apertures 68 formed therethrough and the plate 67 may be utilized to abuttingly support the lower edge of a wall panel, such as the wall panel 70 ilustrated in FIG. 6 of the drawings, relative to a stud 72 with which the clamp 10 is clampingly engaged in an inverted position relative to the position thereof illustrated in FIG. 1.

Further, the opposite ends of the flange 12 include apertures 80 formed therethrough by which one or two nails 82 may be used to temporarily nail the flange 12 to a stud, or the like, with which the clamp 10 is clampingly engaged.

The flanges 12 and 14, as well as the bight portion 16, are preferably constructed of strong metal and the lever 26 may also be constructed of metal. Further, the L-shaped member 52 and the plate 66 are preferably constructed of metal.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A lumber clamp comprising an elongated channel-shaped body including a pair of generally parallel opposite side longitudinal flanges and an elongated bight portion extending between one pair of corresponding longitudinal edge portions of said flanges, one of said flanges being rigidly supported from said bight portion and the other flange being pivotally supported from said bight portion for oscillation relative thereto about an axis extending longitudinally of said body and adjacent the adjacent marginal edges of said other flange and bight portion, for oscillation of said other flange between a closed position with the adjacent sides of said flanges substantially parallel and an open position with the free edge of said other flange remote from said bight portion swung away from the corresponding free edge of said one flange, and clamp actuator means shiftably supported from said body for movement between active and inactive positions and including portions engageable with said flanges intermediate their opposite ends for camming said other flange toward said closed position and bracing said one flange against flexure away from said other flange upon movement of said clamp actuator means to said active position, said clamp actuator means, when in said inactive position, being shifted to an out of the way position for movement of said other flange toward said open position.

2. The combination of claim 1 wherein said clamp actuator means comprises a lever member pivotally supported from said portion.

3. The combination of claim 2 wherein said lever member is pivotally supported from said bight portion for oscillation relative to said bight portion about an axis extending transversely of one end of said lever.

4. The combination of claim 3 wherein said actuator means portions are supported from said lever intermediate its opposite ends.

5. The combination of claim 4 wherein said axis extends transversely of said body on the side of bight portion remote from said flanges.

6. The combination of claim 5 wherein said axis extends transversely of said body adjacent one end thereof.

7. The combination of claim 6 wherein said actuator means portions are carried by a portion of said lever centrally intermediate its opposite ends and said lever is of a length generally equal to the length of said body.

8. The combination of claim 1 wherein one end of said body includes means defining a transversely extending and endwise outwardly opening channel on the side of said bight portion remote from said flanges.

9. The combination of claim 1 wherein a first end of said body includes a transverse abutment plate portion projecting outwardly of the side of said bight portion remote from said flanges.

10. The combination of claim 9 wherein one end of said body includes means defining a transversely extending and endwise outwardly opening channel on the side of said bight portion remote from said flanges.

11. The combination of claim 10 wherein said first end comprises the other end of said body.

12. The combination of claim 1 wherein the opposing inner surfaces of said flanges include outwardly projecting gripping elements adapted to penetrate at least the opposing surface portions of a piece of lumber clamped between said flanges.

13. The combination of claim 12 wherein said gripping elements comprise the inner ends of fasteners secured through said flanges from the outer sides thereof.

14. The combination of claim 13 including apertured plates secured over the remote sides of said flanges with the outer ends of said fasteners received in the apertures formed in said plates.

15. The combination of claim 1 wherein said clamp actuator means comprises a lever member pivotally supported from said portion, said lever member being pivotally supported from said bight portion for oscillation relative to said bight portion about an axis extending transversely of one end of said lever, and means operative to releasably retain said lever in the active position thereof.

16. A lumber clamp comprising an elongated channel shaped body including a pair of generally parallel opposite side longitudinal flanges and an elongated bight portion extending between one pair of corresponding longitudinal edge portions of said flanges, one of said flanges being rigidly supported from said bight portion and the other flange being pivotally supported from said bight portion for oscillation relative thereto about an axis extending longitudinally of said body and adjacent the adjacent marginal edges of said other flange and bight portion, for oscillation of said other flange between a closed position with the adjacent sides of said flanges substantially parallel and an open position with the free edge of said other flange remote from said bight portion away from the corresponding free edge of said one flange, and clamp actuator means shiftably supported from said body for movement between active and inactive positions and operative to swing said other flange toward said closed position upon movement of said clamp actuator means to said active position from said inactive position, said clamp actuator means, when in said inactive position, being inactive to prevent movement of said other flange toward said open position, the opposing inner surfaces of said flanges including outwardly projecting gripping elements adapted to penetrate at least the opposing surface portions of a piece of lumber clamped between said flanges.

* * * * *